(12) United States Patent
Murakami et al.

(10) Patent No.: US 10,567,089 B2
(45) Date of Patent: Feb. 18, 2020

(54) TRANSMISSION DEVICE, MULTI-QUANTUM COMMUNICATION SYSTEM, AND MULTI-QUANTUM COMMUNICATION METHOD

(71) Applicant: Kabushiki Kaisha Toshiba, Minato-ku (JP)

(72) Inventors: Akira Murakami, Kawasaki (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 116 days.

(21) Appl. No.: 15/679,209

(22) Filed: Aug. 17, 2017

(65) Prior Publication Data
US 2018/0269989 A1 Sep. 20, 2018

(30) Foreign Application Priority Data
Mar. 17, 2017 (JP) .................................. 2017-053331

(51) Int. Cl.
*H04B 10/70* (2013.01)
*H04B 10/516* (2013.01)
(Continued)

(52) U.S. Cl.
CPC .......... *H04B 10/70* (2013.01); *H04B 10/516* (2013.01); *H04J 14/00* (2013.01); *H04J 14/0227* (2013.01)

(58) Field of Classification Search
USPC ................................ 398/51, 65, 48, 155, 141
See application file for complete search history.

(56) References Cited

U.S. PATENT DOCUMENTS 9,401,766 B2  7/2016  Yuan et al.
2006/0034615 A1*  2/2006  Vig ........................ H04L 9/0852
398/154

(Continued)

FOREIGN PATENT DOCUMENTS

GB  2 405 294 B  8/2006
JP  2013-13073 A  1/2013
JP  2017-175320 A  9/2017

OTHER PUBLICATIONS

Valeria Scarani, et al., "The security of practical quantum key distribution", Reviews of Modern Physics, vol. 81 No. 3, Jul.-Sep. 2009, pp. 1301-1350.

(Continued)

*Primary Examiner* — David C Payne
*Assistant Examiner* — Pranesh K Barua
(74) *Attorney, Agent, or Firm* — Oblon, McClelland, Maier & Neustadt, L.L.P.

(57) ABSTRACT

According to an embodiment, a transmission device is for a second quantum communication system sharing a quantum communication channel with a first quantum communication system, and includes a generator, a modulator, a controller, and a changer. The generator is configured to generate a photon. The modulator is configured to transmit a quantum signal generated by modulating the photon to a reception device. The controller is configured to control the generator and the modulator. The changer is configured to input, to the controller, control signals for changing an operation timing of the generator and an operation timing of the modulator when an error rate of the quantum signal of the first quantum communication system and an error rate of the quantum signal of the second quantum communication system are equal to or higher than a predetermined threshold.

5 Claims, 7 Drawing Sheets

(51) Int. Cl.
*H04J 14/00* (2006.01)
*H04J 14/02* (2006.01)

(56) References Cited

U.S. PATENT DOCUMENTS

| | | | | |
|---|---|---|---|---|
| 2006/0045527 | A1* | 3/2006 | Maeda | H04B 10/70 398/79 |
| 2010/0254704 | A1* | 10/2010 | Aoki | H04B 10/40 398/45 |
| 2013/0209090 | A1* | 8/2013 | Rope | H04B 17/101 398/25 |
| 2015/0195087 | A1* | 7/2015 | Doi | G06N 10/00 380/278 |
| 2015/0215122 | A1* | 7/2015 | Takahashi | H04L 9/0855 380/283 |
| 2015/0270959 | A1* | 9/2015 | Tanizawa | H04B 10/70 380/30 |
| 2016/0226598 | A1* | 8/2016 | Zhao | G09C 1/00 |
| 2016/0277183 | A1* | 9/2016 | Murakami | H04L 9/0858 |
| 2017/0099139 | A1* | 4/2017 | Han | H04L 9/0852 |
| 2017/0279540 | A1 | 9/2017 | Tanizawa et al. | |

OTHER PUBLICATIONS

Iris Choi, et al., "Field trail of a quantum secured 10 Gb/s DWDM transmission system over a single installed fiber", Optics Express, vol. 22 No. 19, Sep. 22, 2014, pp. 1-8.
Bernd Fröhlich, et al., "A quantum access network", Nature, vol. 501, Sep. 5, 2013, pp. 69-72 with cover pages.

* cited by examiner

TRANSMISSION DEVICE, MULTI-QUANTUM COMMUNICATION SYSTEM, AND MULTI-QUANTUM COMMUNICATION METHOD

CROSS-REFERENCE TO RELATED APPLICATIONS

This application is based upon and claims the benefit of priority from Japanese Patent Application No. 2017-053331, filed on Mar. 17, 2017; the entire contents of which are incorporated herein by reference.

FIELD

Embodiments described herein relate generally to a transmission device, a multi-quantum communication system, and a multi-quantum communication method.

BACKGROUND

In the known quantum key distribution (QKD), a transmission device and a reception device that are connected with an optical fiber use a single photon transmitted continuously between the devices to securely share a cryptographic key. The principle of the quantum mechanics guarantees that the shared cryptographic key based on the quantum key distribution technique has not been eavesdropped. The shared cryptographic key is used in the cryptographic communication such as a one-time pad. The one-time pad is the encrypted communication method in which the cryptographic key with the same size as the data to be exchanged is used and the cryptographic key is discarded after every use. The information theory guarantees that the cryptographic data exchanged by the one-time pad can never be cracked by any skilled eavesdropper.

In the conventional technique, however, it has been difficult to stabilize the distribution speed of the cryptographic key information when the quantum communication system shares the quantum communication channel.

DETAILED DESCRIPTION

According to an embodiment, a transmission device is for a second quantum communication system sharing a quantum communication channel with a first quantum communication system, and includes a generator, a modulator, a controller, and a changer. The generator is configured to generate a photon. The modulator is configured to transmit a quantum signal generated by modulating the photon to a reception device. The controller is configured to control the generator and the modulator. The changer is configured to input, to the controller, control signals for changing an operation timing of the generator and an operation timing of the modulator when an error rate of the quantum signal of the first quantum communication system and an error rate of the quantum signal of the second quantum communication system are equal to or higher than a predetermined threshold.

Embodiments of a transmission device, a multi-quantum communication system, and a multi-quantum communication method will hereinafter be described in detail with reference to the attached drawings.

First Embodiment

Figure 1:
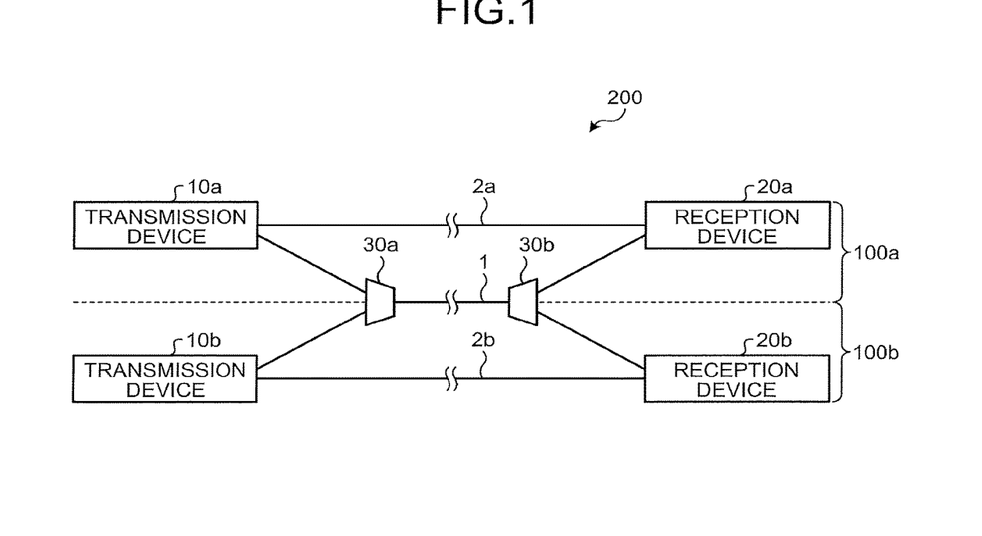
FIG. 1 is a diagram illustrating a device structure of a multi-quantum communication system according to a first embodiment.

In the beginning, a first embodiment is described.
Example of Device Structure
FIG. 1 is a diagram illustrating an example of a device structure of a multi-quantum communication system 200 according to the first embodiment. The multi-quantum communication system 200 according to the first embodiment includes a quantum communication channel 1, a classical communication channel 2a, a classical communication channel 2b, a transmission device 10a, a transmission device 10b, a reception device 20a, a reception device 20b, a multiplexing device 30a, and a multiplexing device 30b.

The classical communication channel 2a, the transmission device 10a, and the reception device 20a are used by a quantum communication system 100a. The classical communication channel 2b, the transmission device 10b, and the reception device 20b are used by a quantum communication system 100b. The quantum communication channel 1, the multiplexing device 30a, and the multiplexing device 30b are shared by the quantum communication systems 100a and 100b.

The classical communication channels 2a and 2b are hereinafter simply referred to as the classical communication channel 2 unless the channels need to be distinguished. The transmission devices 10a and 10b are simply referred to as the transmission device 10 unless the devices need to be distinguished. The reception devices 20a and 20b are simply referred to as the reception device 20 unless the devices need to be distinguished. The multiplexing devices 30a and 30b are simply referred to as the multiplexing device 30 unless the devices need to be distinguished. The quantum communication systems 100a and 100b are simply referred to as the quantum communication system 100 unless the systems need to be distinguished.

The quantum communication channel 1 is an optical fiber for transmitting and receiving single photon. The transmission device 10 generates a random number that is the basis of a cryptographic key. The transmission device 10 then encodes the random number into a single photon, and transmits the single photon to the reception device 20 through the quantum communication channel 1.

The reception device 20 detects and decodes the single photon transmitted through the quantum communication channel 1. The transmission device 10 and the reception device 20 further execute a sifting process, an error correction process, and a confidentiality enhancement process, thereby generating a cryptographic key (shared key).

In the current standard technique, it is difficult to operate a perfect single photon source in an actual environment. Therefore, usually, the quasi-single photon (quasi-single photon) is generated by attenuating the optical pulse output of a laser device.

The quantum communication system 100 needs to transmit a photon while the quantum state is maintained. Therefore, an amplifier that has conventionally been used in the Internet communication cannot be used in the quantum communication system 100. Usually, when the quantum communication system 100 is operated in the actual environment, the dedicated optical fiber that does not use the amplifier is used.

The classical communication channel 2 transmits and receives the control information for generating the quantum key information. The control information is, for example, a synchronous signal for synchronizing between the transmission device 10 and the reception device 20. The classical communication channel 2 may be either a wired channel such as an optical fiber or a wireless channel, or may be implemented by combining a wired channel and a wireless channel.

In the first embodiment, the device to transmit a photon is called the transmission device 10 for the convenience of description, but the transmission device 10 may have a function of receiving a photon. Similarly, the reception device 20 may have a function of transmitting a photon.

The multiplexing device 30 is a device (optical wavelength multiplexing module) that multiplexes the optical wavelengths of a photon on the quantum communication system 100a and a photon on the quantum communication system 100b. By using the multiplexing device 30, the quantum communication channel 1 can be implemented by one optical fiber.

Note that the number of optical fibers between the transmission device 10 and the multiplexing device 30a is two. Therefore, the number of optical fibers between the transmission device 10 and the multiplexing device 30a is the same as that in the case where the multiplexing is not performed. Similarly, the number of optical fibers between the reception device 20 and the multiplexing device 30b is two. Therefore, the number of optical fibers between the transmission device 10 and the multiplexing device 30b is the same as that in the case where the multiplexing is not performed.

As illustrated in FIG. 1, a method of multiplexing the quantum communication channel 1 is valuable when the distance between the transmission device 10 (reception device 20) and the multiplexing device 30a (multiplexing device 30b) is shorter than the distance between the multiplexing device 30a and the multiplexing device 30b. In the method of multiplexing the quantum communication channel 1 illustrated in FIG. 1, there is no particular limitation on the number of optical fibers between the transmission device 10 (reception device 20) and the multiplexing device 30a (multiplexing device 30b), but the method is valuable when there is a limitation on the number of optical fibers between the multiplexing device 30a and the multiplexing device 30b.

Note that the number of quantum communication systems 100 that can be multiplexed is restricted by the bandwidth that can be used by the multiplexing device 30. The number of quantum communication systems 100 that can be multiplexed can be increased as the bandwidth that is allocated to the quantum signal of each quantum communication system is narrower.

Figure 2:
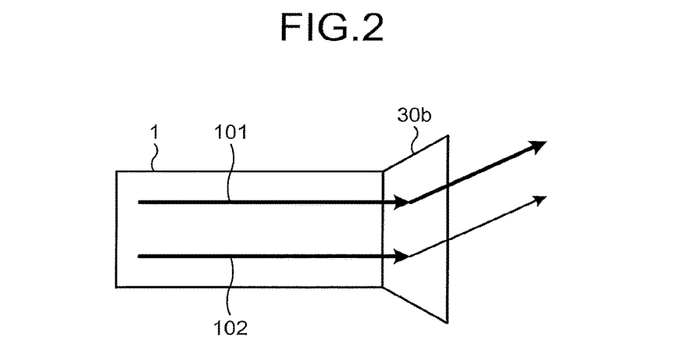
FIG. 2 is a diagram for describing a crosstalk problem due to a part of a quantum signal.

Next, the following describes a crosstalk problem that occurs when the quantum signals are input from the multiplexing device 30b to the respective reception devices 20 while the one quantum signal is mixed to the other quantum signal.

FIG. 2 is a diagram for describing the crosstalk problem due to a part of a quantum signal 102. In the example of FIG. 2, a part of the quantum signal 102 of the quantum communication system 100b is input to the reception device 20a of the quantum communication system 100a when demultiplexing is performed in the multiplexing device 30b.

The transmission devices 10a and 10b generate the quantum signals 101 and 102 by using photons generated independently. Therefore, for the reception device 20a, the photon expressing the quantum signal 102 is nothing but a noise.

In the quantum communication system 100a, the reception device 20a has only a function of detecting whether a photon has been received. Therefore, the reception device 20a cannot identify the transmission source from which the photon has been received. Instead, the multiplexing device 30b is installed in order to distinguish (demultiplex) the quantum signal 101 (102).

In the occurrence of the phenomenon as illustrated in FIG. 2, the error rate of the photons received by the reception device 20a increases, so that the secure key rate decreases.

The secure key rate is a fundamental performance index of the quantum communication system 100. The secure key rate is defined by the length of the cryptographic key (bit length) that can be generated and shared in unit time. The secure key rate is also called a key distribution speed. The secure key rate depends on a photon generation speed, the attenuation rate of the quantum communication channel 1, the error rate of the quantum communication channel 1, the photon detection rate of the reception device 20, the photon detection error rate of the reception device 20, and the like.

The phenomenon as illustrated in FIG. 2 occurs depending on the demultiplexing capability of the multiplexing device 30b, the closeness of the wavelength between the quantum signals 101 and 102, and the intensity difference between the quantum signals 101 and 102.

If the demultiplexing capability of the multiplexing device 30b is low, a part of photons that represent the quantum signal 102 is mixed with the quantum signal 101 as illustrated in FIG. 2.

As described above, the number of bands of the optical wavelength multiplexing needs to be allocated efficiently in order to increase the number of multiplexes of the multi-quantum communication system 200. Therefore, the wavelengths to be allocated to the quantum communication systems (100a, 100b, . . . ) are preferably denser in order to increase the efficiency. On the other hand, as the wavelengths to be allocated are denser, the phenomenon as illustrated in FIG. 2 is more likely to occur.

When the intensity of the quantum signal 102 is higher than the intensity of the quantum signal 101 and a part of the quantum signal 102 (signal that is demultiplexed by mistake) has the intensity of the same degree as the quantum signal 101, the error rate of the quantum signal 101 increases even more.

In order to increase the security of the quantum communication system 100, a method called a decoy method may be used. In the decoy method, a plurality of quantum signals 101 (102) with the different intensities is used.

Figure 3:
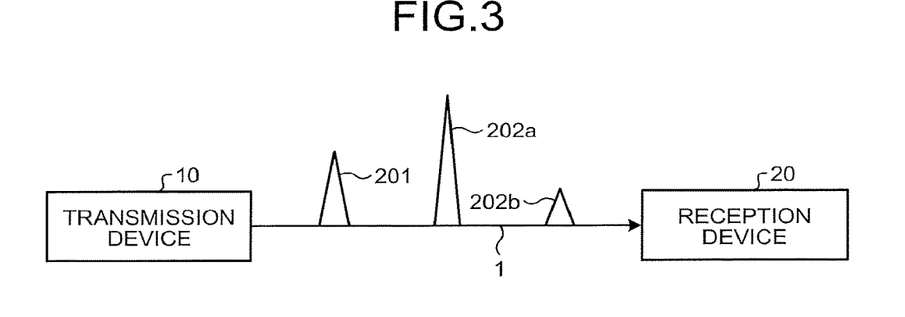
FIG. 3 is a diagram for describing a decoy method.

FIG. 3 is a diagram for describing a decoy method. FIG. 3 illustrates a quasi-single photon signal 201, and decoy signals 202a and 202b. The decoy signal 202a has higher intensity than that of the quasi-single photon signal 201. The decoy signal 202b has lower intensity than that of the quasi-single photon signal 201. The intensity of the decoy signal 202a (202b) is different depending on the quantum communication system 100 and both may be used in combination as illustrated in FIG. 3.

Therefore, if the quantum signal 101 and the quantum signal 102 have different intensities and the decoy signal 202a and the decoy signal 202b have different intensities, the occurrence of the aforementioned crosstalk tends to have larger influence on the secure rate. This is because of the following reason: if the intensity of the signal causing crosstalk (a part of the signal with high intensity) becomes substantially the same as that of the signal with low intensity, the error rate of the quantum signal 101 (102) increases and moreover, the number of detections of the decoy signal 202a (202b) decreases and the error rate of the decoy signals increases.

Figure 4:
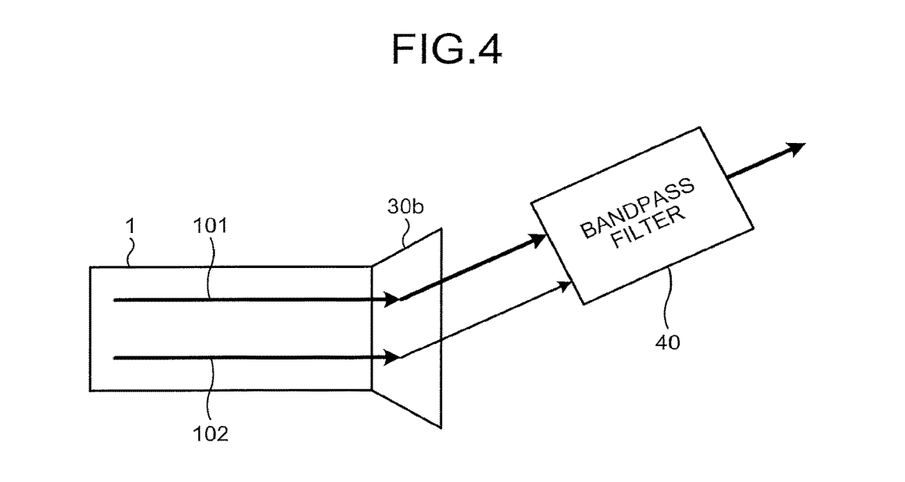
FIG. 4 is a diagram for describing a problem when a bandpass filter is used.

Next, the following describes a problem occurring when a bandpass filter is used to deal with the signal causing crosstalk.

FIG. 4 is a diagram for describing the problem when a bandpass filter 40 is used. The bandpass filter 40 is a filter that transmits only light with a particular wavelength. To further increase the effect, the bandpass filter 40 may be disposed in multiple stages. However, disposing the bandpass filter 40 causes a problem because of the disposing of the bandpass filter 40. For example, as more bandpass filters 40 are disposed, the installation cost increases. In another example, the light attenuates because of passing the bandpass filter 40, so that the secure key rate of the quantum communication system 100 decreases. In still another example, since the transmission device 10a needs to generate the quantum signal 101 with the wavelength exactly the same as that of the bandpass filter 40, the cost of controlling the quantum communication system 100a increases.

Next, an example of the quantum key distribution process according to the first embodiment is described.

Quantum Key Distribution Process

Figure 5:
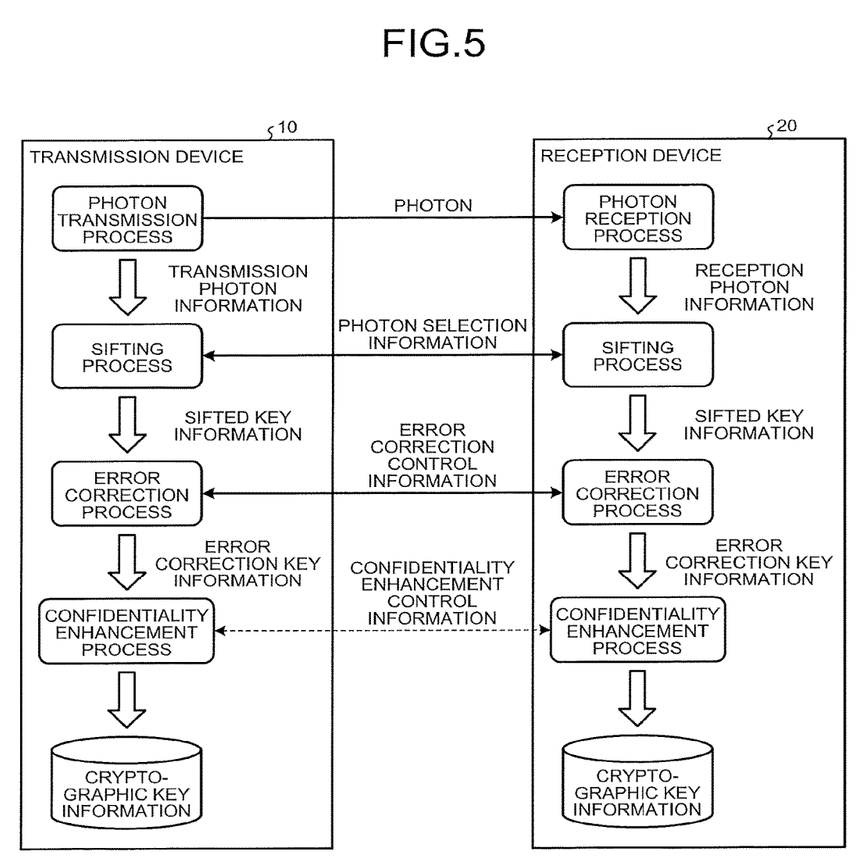
FIG. 5 is a diagram illustrating an example of a quantum key distribution process in the first embodiment.

FIG. 5 is a diagram illustrating an example of the quantum key distribution process according to the first embodiment. The quantum key distribution process includes four steps triggered by the transmission/reception of a photon. A first step is a photon transmission/reception process. A second step is a sifting process. A third step is an error correction process. A fourth step is a confidentiality enhancement process.

Photon Transmission/Reception Process

The transmission device 10 transmits a photon to the reception device 20 through the quantum communication channel (photon transmission process). The reception device 20 receives the photon transmitted from the transmission device (photon reception process). The transmission device 10 stores the transmission photon information associating the base information when transmitting the photon (transmission base) with the bit information (transmission bit). The transmission bit and the transmission base are randomly selected for each photon. Similarly, the reception device 20 stores the reception photon information associating the base information when receiving the photon (reception base) with the bit information (reception bit). The reception base is randomly selected for each photon.

Sifting Process

In the sifting process of the transmission device 10, the transmission photon information is used. In the sifting process of the reception device 20, the reception photon information is used. First, the photon selection information is exchanged between the transmission device 10 and the reception device 20. The photon selection information is the information for associating the transmission photon transmitted from the transmission device 10 and the reception photon received by the reception device 20 with each other.

Next, the transmission device 10 selects from among the transmission photon information, the transmission photon information in which the transmission base when the transmission device 10 transmits the photon and the reception base when the reception device 20 receives the photon coincide with each other. Moreover, the reception device 20 selects from among the reception photon information, the reception photon information in which the transmission base when the transmission device 10 transmits the photon and the reception base when the reception device 20 receives the photon coincide with each other.

Next, the transmission device 10 generates the sifted key information by the bit string including the transmission bit included in the selected transmission photon information. Moreover, the reception device 20 generates the sifted key information by the bit string including the reception bit included in the selected reception photon information.

In order to perform the sifting process, it is necessary that the identification of the photon is the same between the transmission device 10 and the reception device 20. Thus, the transmission device 10 and the reception device 20 normally operate in synchronization.

The photon received by the reception device 20 from the transmission device 10 includes the noise on the optical fiber, the noise due to the photon detector characteristic of the reception device 20, the trace of eavesdropping by an eavesdropper, and the like in the photon transmission/reception process. Therefore, the sifted key information of the transmission device 10 and the sifted key information of the reception device 20 may be different partially (an error may be included).

Therefore, the transmission device 10 and the reception device 20 calculate the estimated error rate of the sifted key information by exchanging a part of data included in the sifted key information. The estimated error rate is executed in one of or both the transmission device 10 and the reception device 20. If this estimated error rate is equal to or lower than a threshold, the transmission device 10 and the reception device 20 execute the following error correction process.

Error Correction Process

In the error correction process, the sifted key information after the sifting process is used. The error correction process is intended to correct the error included in the sifted key information and generate the bit string that coincides between the transmission device 10 and the reception device 20. The bit string generated by the error correction process is called the error correction key information. In the error correction process, the error correction control information is exchanged between the transmission device 10 and the reception device 20. As a result of this error correction process, the error rate of the sifted key information can be calculated.

Confidentiality Enhancement Process

In the confidentiality enhancement process, the error correction key information after the error correction process is used. The confidentiality enhancement process is intended to offset the quantity of information that may have been leaked theoretically in the photon transmission/reception process, the sifting process, and the error correction process on the basis of the quantum cryptography theory. By the confidentiality enhancement process, the bit string that is completely free from an eavesdropping possibility and coincides between the transmission device 10 and the reception device 20 can be generated as the cryptographic key information.

Specifically, in the confidentiality enhancement process, the correction key information is compressed by the quantity of information that may have been leaked. The compression degree is determined by the quantum cryptography theory on the basis of the statistical data obtained in the process up to the confidentiality enhancement process. Note that the confidentiality enhancement process may include the process of exchanging the control information for enhancing the confidentiality between the transmission device 10 and the reception device 20.

Next, the following describes an example of the functional structure of the transmission device 10 and the reception device 20 according to the first embodiment.

Example of Functional Structure

Figure 6:
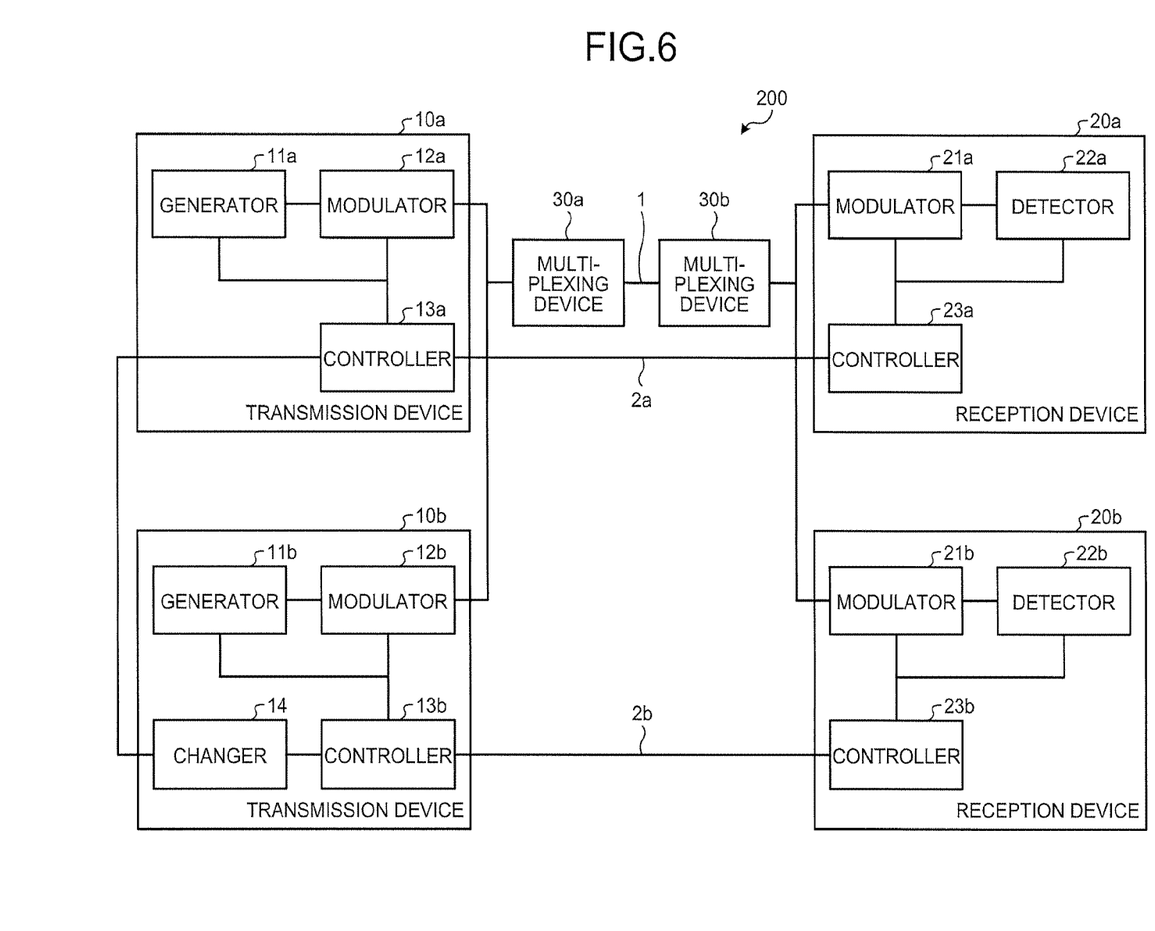
FIG. 6 is a diagram illustrating an example of a functional structure of a transmission device and a reception device according to the first embodiment.

FIG. 6 is a diagram illustrating an example of the functional structure of the transmission device 10 and the reception device 20 according to the first embodiment. The transmission device 10a according to the first embodiment includes a generator 11a, a modulator 12a, and a controller 13a. The transmission device 10b according to the first embodiment includes a generator 11b, a modulator 12b, a controller 13b, and a changer 14. The reception device 20a according to the first embodiment includes a modulator 21a, a detector 22a, and a controller 23a. The reception device 20b according to the first embodiment includes a modulator 21b, a detector 22b, and a controller 23b.

Description is hereinafter made of the functional structure in the example of the transmission device 10b and the reception device 20b. First, an example of the functional structure of the transmission device 10b is described.

The generator 11b generates a single photon. The generation source for the single photon may be an attenuated normal laser light source. When a normal laser light source is used, strictly speaking, it may occur that the transmission device 10 transmits a plurality of transmission photons instead of single transmission photon in encoding the transmission base and the transmission bit. To eliminate such occurrence and guarantee the secured quantum key distribution, the aforementioned decoy method may be used.

In the decoy method, when the bit is transmitted, the intensity of the output laser is not made constantly the same but made different at a certain rate from the intensity when the normal bit transmission is performed. In this case, a photon generator may be configured by, in addition to a semiconductor laser, an attenuator and a driving circuit thereof. The generator 11b may generate photons by driving the aforementioned laser light source in a pulsed manner. The pulse driving speed (driving frequency) is very high and is 1 GHz, for example. The pulse driving speed is not limited to 1 GHz and may be higher or lower.

The modulator 12b modulates a photon on the basis of the transmission bit randomly selected and the transmission base randomly selected. The modulation method is arbitrarily selected. The modulator 12b may employ, for example, the light phase or the light polarization. In the case of employing the light phase, for example, the modulator 12b assigns 0 to the modulation quantity for a bit value of 0, assigns $\pi$ to the modulation quantity for a bit value of 1, assigns 0 to the modulation quantity for a base value of 0, and assigns $\pi/2$ to the modulation quantity for a base value of 1. Finally, the modulation quantity by the modulator 12b is equal to the total of the modulation quantity of the bit value and the modulation quantity of the base value.

The modulator 12b selects the transmission bit and the transmission base for each photon. When selecting the transmission base, the modulator 12b randomly selects the transmission base from two kinds basically at a ratio of 50:50, but in order to distribute the cryptographic key more efficiently, this ratio may be biased and the transmission base may be selected at a different selection ratio.

The controller 13b controls the operation of the aforementioned generator 11b and modulator 12b. The controller 13b executes the sifting process, the error correction process, and the confidentiality enhancement process described above.

The changer 14 accepts the error rate of the quantum signal 101 of the quantum communication system 100a and the error rate of the quantum signal 102 of the quantum communication system 100b. If the error rate of the quantum signal 101 of the quantum communication system 100a and the error rate of the quantum signal 102 of the quantum communication system 100b are equal to or higher than a predetermined threshold, the changer 14 inputs control signals to change the operation timing of the generator 11b and the operation timing of the modulator 12b to the controller 13b.

Note that the changer 14 may input control signals to change the operation timing of the generator 11a and the operation timing of the modulator 12a to the controller 13a.

Next, an example of the functional structure of the reception device 20b is described.

The modulator 21b modulates the received photon by using the randomly selected reception base, which is similar to the transmission device 10b. The modulation method is arbitrarily selected. The modulation method may employ, for example, the light phase or the light polarization, but it is necessary that the modulation method is the same as that of the transmission device 10b. In the case of employing the light phase, for example, the modulator 21b assigns 0 to the modulation quantity for a base value of 0, and assigns $\pi/2$ to the modulation quantity for a base value of 1.

When selecting the reception base, the modulator 21b randomly selects the reception base from two kinds basically at a ratio of 50:50, but in order to distribute the cryptographic key more efficiently, this ratio may be biased and the reception base may be selected at a different selection ratio. However, this selection ratio needs to be the same as that of the transmission base on the transmission side.

The detector 22b detects the photon output from the modulator 21b. The detector 22b decodes the reception bit from the single photon by having the reception base in accordance with the light phase or polarization.

To receive (detect) a photon, a photon detection element called an avalanche photodiode (APD) may be used. The APD may be, for example, an APD formed of indium-gallium-arsenic, silicon, germanium, or gallium nitride.

The APD is driven in the operation mode called the Geiger mode. In the Geiger mode, the operation is carried out by setting the reverse voltage of the APD to be equal to or higher than a breakdown voltage, and by the avalanche effect, the large pulse is generated relative to the incidence of the received photon; thus, the single photon is detected. By supplying a square-wave or sine-wave voltage including the voltage higher than the breakdown voltage and the voltage lower than the breakdown voltage, the detector 22b continuously detects the single photon. The driving speed is high and for example, 1 GHz. Note that the driving speed may be higher or lower than 1 GHz.

The controller 23b controls the operation of the modulator 21b and the detector 22b described above. The controller 23b executes the sifting process, the error correction process, and the confidentiality enhancement process described above.

In order to perform the sifting process, the controllers 13b and 23b synchronize their time, and identify a photon based on the time. For example, the controllers 13b and 23b have oscillators that are synchronized with each other. Synchronous signals for synchronizing the oscillators are transmitted through the classical communication channel 2b. The controllers 13b and 23b give a number to the photon on the basis of the counting by the oscillators, and identify the photon by the number.

Next, the following describes the communication channel between the transmission device 10b and the reception device 20b.

The quantum communication channel 1 includes the aforementioned multiplexing devices 30a and 30b. The multiplexing device 30a multiplexes a plurality of light rays with different wavelengths. The multiplexing device 30b performs demultiplexing in accordance with the wavelength. The multiplexing devices 30a and 30b multiplex the quantum signals 101 and 102 by using, for example, CWDM (Coarse Wavelength Division Multiplexing), DWDM (Dense Wavelength Division Multiplexing), or the like.

The quantum communication channel 1 transmits the single photon expressing the quantum signal 101 (102). The classical communication channel 2b transmits the control information. The control information is, for example, the aforementioned photon selection information (see FIG. 5) and the aforementioned synchronous signal. The description of the classical communication channel 2a is omitted because the classical communication channel 2a is similar to the classical communication channel 2b.

The quantum communication channel 1 and the classical communication channel 2b usually employ a standard single-mode optical fiber, but may alternatively employ a multi-mode optical fiber. In the case of using the multi-mode optical fiber, each transmission channel corresponds to each core of the multi-mode optical fiber. Since the single photon and the photon identification information have the very different light intensity, different optical fibers (or different cores) are allocated to the communication channels. The aforementioned synchronous signals may be transmitted along the same communication channel as the photon identification information or along different communication channels.

Figure 7:
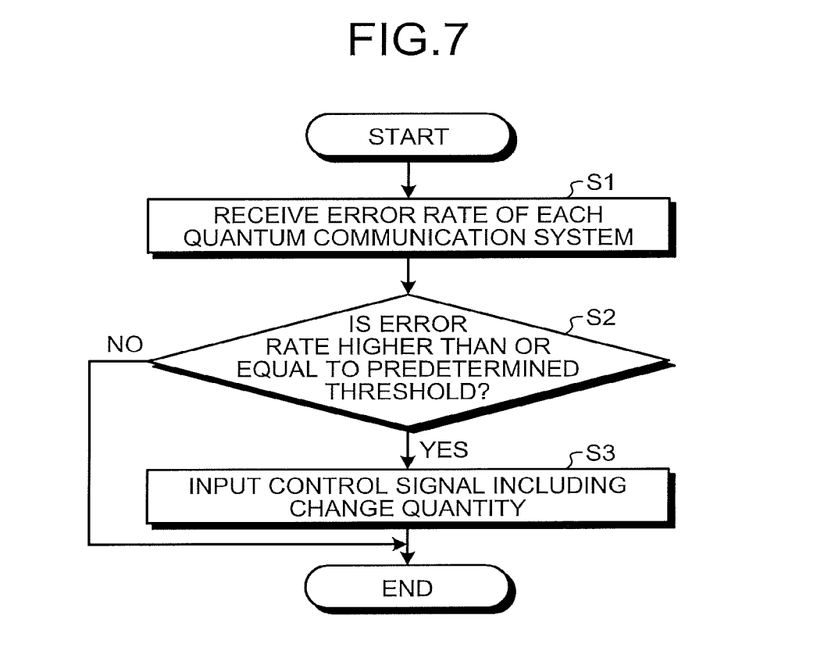
FIG. 7 is a flowchart illustrating an example of the process of a changer according to the first embodiment.

Next, with reference to the flowchart, the following describes an example of a method for changing the operation timing of the generator 11b and the modulator 12b according to the first embodiment.

FIG. 7 is a flowchart illustrating an example of the process of the changer 14 according to the first embodiment. First, the changer 14 receives the error rate of the quantum communication system 100a and the error rate of the quantum communication system 100b (Step S1). Next, the changer 14 determines whether the error rate received at Step S1 is equal to or higher than a predetermined threshold (Step S2).

If the error rate is not equal to or higher than the predetermined threshold (No at Step S2), the process ends. If the error rate is equal to or higher than the predetermined threshold (Yes at Step S2), the changer 14 inputs the control signal including the change quantity to the controller 13b (Step S3).

The predetermined threshold may be arbitrarily determined. One example of the predetermined threshold is the double of the error rate of the quantum signal 102 in the case where the quantum communication system 100b is not multiplexed. The predetermined threshold may be dynamically changed in accordance with the error rate obtained in the operation of the multi-quantum communication system 200.

The changer 14 records the past error rates of the quantum communication systems 100a and 100b, for example, and based on the past error rates, the changer 14 may change the predetermined threshold. The number of past error rates is, for example, 100. More specifically, one example of the predetermined threshold is the double of the average of the error rate of the quantum communication system 100a and the error rate of the quantum communication system 100b.

The change quantity may be arbitrarily determined. The change quantity may be a fixed value or may be determined dynamically.

If the generation speed of the quantum signal 102 is, for example, 1 GHz (i.e., the intervals of the quantum signals 102 is 1 ns), the change quantity may be a smaller value than the operation speed (50 ps, 100 ps, 150 ps, or the like). In another example, if the generation speed of the quantum signal 102 is 1 GHz, the change quantity may be the ratio relative to the operation speed of 1 GHz, such as 1/20 (50 ps), 1/10 (100 ps), 1/5 (200 ps), or the like.

In still another example, the change quantity may be changed in accordance with the number of times of changes per unit time. If the error rate received at Step S1 after the operation timing is changed to 50 ps is equal to or higher than the predetermined threshold, the changer 14 may set the change quantity to 100 ps.

The operation timing may be advanced or delayed. The time direction where the operation timing is changed may be determined when, for example, the multi-quantum communication system 1 is designed. In another example, if the improvement is not observed even though the timing is advanced by a certain number of times, the timing may be delayed by a certain number of times; thus, the time direction where the operation timing is changed may be a combination of the both.

The change quantity may be either a positive numeral or a negative numeral. For example, if the change quantity is a plus value, the operation timing is delayed by the change quantity, and if the change quantity is a minus value, the operation timing is advanced by the change quantity.

Figure 8:
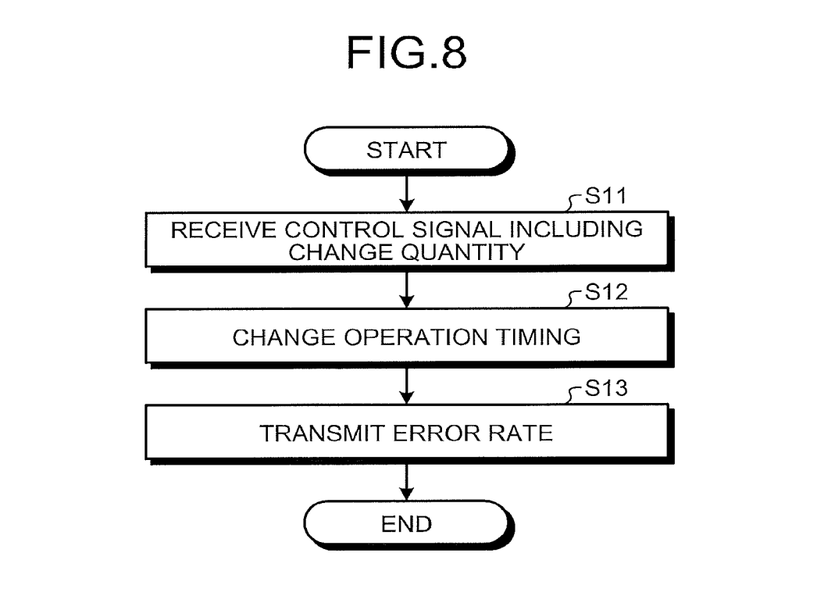
FIG. 8 is a flowchart illustrating an example of the process of a controller according to the first embodiment.

FIG. 8 is a flowchart illustrating an example of the process of the controller 13b according to the first embodiment. First, the controller 13b receives the control signal including the change quantity from the changer 14 (Step S11). Next, the controller 13b changes the operation timing of the generator 11b and the modulator 12b on the basis of the change quantity received at Step S11 (Step S12).

Next, the controller 13b transmits to the changer 14, the error rate calculated after the operation timing is changed at Step S12 (Step S13). Note that the controller 13*a* that does not receive the control signal also transmits the error rate of the quantum communication system 100*a* regularly to the changer 14 in the first embodiment.

If the error rate of the quantum communication systems 100*a* and 100*b* becomes equal to or higher than a predetermined threshold, the error rate of the quantum communication systems 100*a* and 100*b* can be reduced by repeating the process according to the flowchart of FIG. 7 and FIG. 8 described above. Thus, the secure key rate (the distribution speed of the cryptographic key information) of the quantum communication systems 100*a* and 100*b* can be stabilized.

The description made with reference to FIG. 7 and FIG. 8 similarly applies to the case in which the operation timing of the generator 11*a* and the modulator 12*a* is changed (the case in which the controller 13*a* receives the control signal).

Thus, as described above, the generator 11*b* generates a photon in the transmission device 10*b* according to the first embodiment. The modulator 12*b* transmits the quantum signal 102 generated by modulating the photon to the reception device 20*b*. The controller 13*b* controls the generator 11*b* and the modulator 12*b*. Then, if the error rate of the quantum signal 101 of the quantum communication system 100*a* and the error rate of the quantum signal 102 of the quantum communication system 100*b* are equal to or higher than the predetermined threshold, the changer 14 inputs the control signals, which change the operation timing of the generator 11*b* and the operation timing of the modulator 12*b*, to the controller 13*b*.

Thus, in the multi-quantum communication system 200 according to the first embodiment, the distribution speed of the cryptographic key information can be stabilized even when the quantum communication channel 1 is shared.

Specifically, the transmission device 10 and the reception device 20 synchronize with each other. The transmission device 10 generates a photon pulse at certain intervals. The reception device 20 detects a photon only at the timing when the photon pulse has reached. Even in this case, the problem as illustrated in FIG. 2 occurs when the photon pulses of the transmission device 10*a* and the transmission device 10*b* have reached the multiplexing device 30*b* at the same timing.

In view of this, in the multi-quantum communication system 200 according to the first embodiment, the changer 14 receives the error rate of the quantum signal 101 calculated in the reception device 20*a* and the error rate of the quantum signal 102 calculated in the reception device 20*b*. If the error rate is equal to or higher than the predetermined threshold, the changer 14 instructs the transmission device 10*b* to shift the timing of generating the photon pulse by the aforementioned control signal. By shifting the timing of generating the photon pulse on one side, it is possible to prevent the photon pulses of the quantum communication systems 100*a* and 100*b* from reaching the multiplexing device 30*b* at the same timing. Note that the timings of generating all the photon pulses are made different from each other; therefore, in the case of employing the decoy method, the timing of the decoy signal is also shifted in a manner similar to the quasi-single photon signal.

By the multi-quantum communication system 200 according to the first embodiment, it is possible to prevent the deterioration in secure key rate and to reduce the costs for installing and controlling the multi-quantum communication system 200 at the same time.

In the description of the above embodiment, the changer 14 determines the change quantity on the basis of the error rate of the quantum signal 101 (102); however, the change quantity may be determined based on a different piece of information. The different piece of information may be, for example, the number of detections of the photons, the number of detections of the decoy signals and the error rate of the decoy signals when the decoy method is employed, the secure key rate, or the like. The changer 14 may determine the change quantity on the basis of a plurality of pieces of information. The calculation of the error rate of the quantum signal 102, the number of detections of the decoy signals, the error rate of the decoy signals, and the secure key rate may be executed either in the transmission device 10 or in the reception device 20. The information necessary for the calculation is shared between the transmission device 10 and the reception device 20 as appropriate.

Second Embodiment

Next, a second embodiment will be described. In the description of the second embodiment, the description similar to that of the first embodiment is omitted and the part different from the first embodiment will be described.

Example of Device Structure

Figure 9:
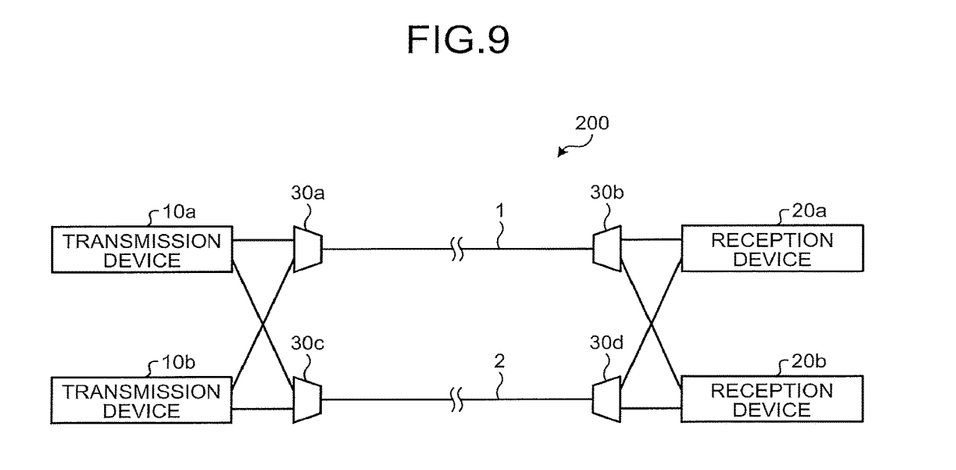
FIG. 9 is a diagram illustrating an example of a device structure of a multi-quantum communication system according to a second embodiment.

FIG. 9 is a diagram illustrating an example of a device structure of a multi-quantum communication system 200 according to the second embodiment. The multi-quantum communication system 200 according to the second embodiment includes the quantum communication channel 1, the classical communication channel 2, the transmission device 10*a*, the transmission device 10*b*, the reception device 20*a*, the reception device 20*b*, the multiplexing device 30*a*, the multiplexing device 30*b*, a multiplexing device 30*c*, and a multiplexing device 30*d*.

That is to say, in the second embodiment, the multiplexing device 30*c* and the multiplexing device 30*d* are further provided and the classical communication channel 2 is shared. This enables the multi-quantum communication system 200 to use fewer optical fibers.

The multiplexing devices 30*c* and 30*d* multiplex the signal expressing the control information of the quantum communication system 100*a* and the signal expressing the control information of the quantum communication system 100*b* by using, for example, CWDM, DWDM, and the like.

The description of the functional structure of the multi-quantum communication system 200 according to the second embodiment is omitted because the functional structure of the multi-quantum communication system 200 according to the second embodiment is the same as that of the multi-quantum communication system 200 according to the first embodiment.

Figure 10:
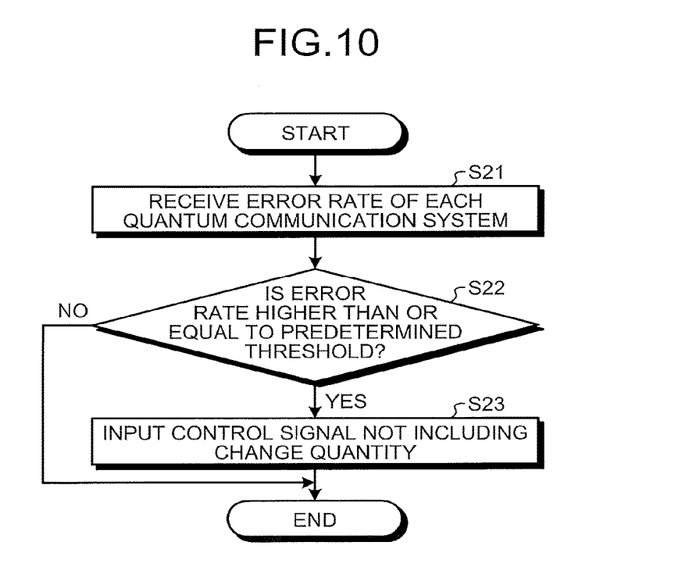
FIG. 10 is a flowchart illustrating an example of the process of a changer according to the second embodiment.

Next, with reference to a flowchart, the following describes an example of a method for changing the operation timing of the generator 11*b* and the modulator 12*b* according to the second embodiment.

FIG. 10 is a flowchart illustrating an example of the process of the changer 14 according to the second embodiment. First, the changer 14 receives the error rate of the quantum communication system 100*a* and the error rate of the quantum communication system 100*b* (Step S21). Next, the changer 14 determines whether the error rate received at Step S21 is equal to or higher than a predetermined threshold (Step S22).

If the error rate is not equal to or higher than the predetermined threshold (No at Step S22), the process ends. If the error rate is equal to or higher than the predetermined threshold (Yes at Step S22), the changer 14 inputs the control signal not including the change quantity to the controller 13*b* (Step S23). That is to say, in the second embodiment, not the changer 14 but the controller 13b determines the change quantity.

Figure 11:
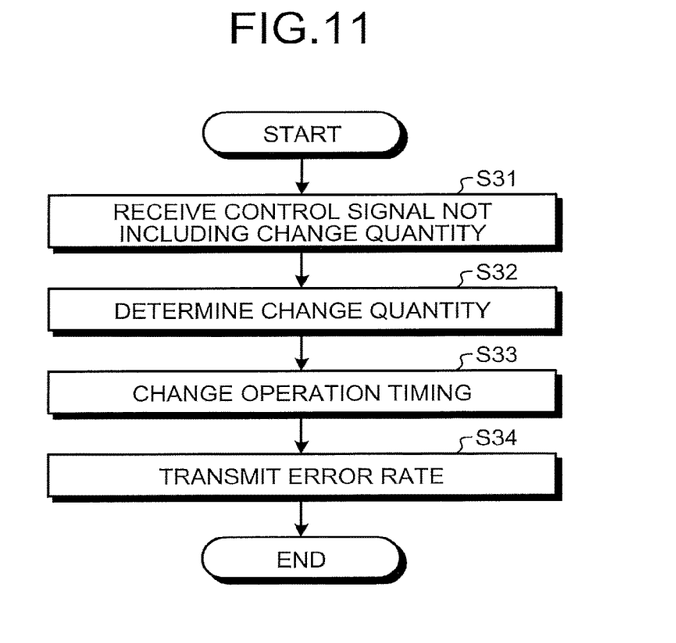
FIG. 11 is a flowchart illustrating an example of the process of a controller according to the second embodiment.

FIG. 11 is a flowchart illustrating an example of the process of the controller 13b according to the second embodiment. First, the controller 13b receives a control signal not including the change quantity from the changer 14 (Step S31). Next, upon the reception of the control signal at Step S31, the controller 13b determines the change quantity (Step S32). The description of how to determine the change quantity is omitted because it is the same as that of the first embodiment.

Next, the controller 13b changes the operation timing of the generator 11b and the modulator 12b on the basis of the change quantity determined at Step S32 (Step S33).

Next, the controller 13b transmits to the changer 14, the error rate calculated after the operation timing is changed at Step S33 (Step S34). Note that the controller 13a that does not receive the control signal also transmits the error rate of the quantum communication system 100a regularly to the changer 14 in the second embodiment.

By repeating the process in accordance with the flowchart illustrated in FIG. 10 and FIG. 11, the error rate of the quantum communication systems 100a and 100b can be reduced.

Note that in the case of changing the operation timing of the generator 11a and the modulator 12a (in the case where the controller 13a receives the control signal), the above description made with reference to FIGS. 10 and 11 also applies.

As described above, in the multi-quantum communication system 200 according to the second embodiment, the effect similar to that of the first embodiment can be obtained although the second embodiment is different from the first embodiment in that the change quantity is determined by the controller 13b.

Finally, the following describes an example of a hardware structure of a main part of the transmission device 10 and the reception device 20 according to the first and the second embodiments.

Example of Hardware Structure

Figure 12:
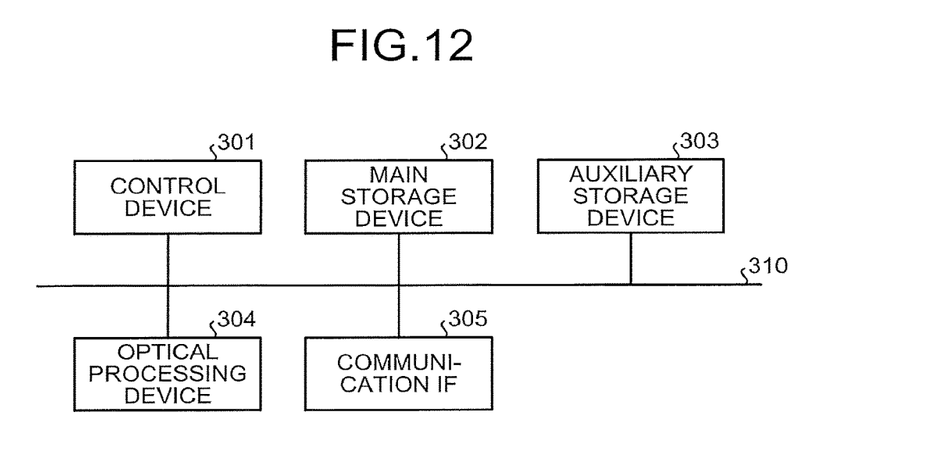
FIG. 12 is a diagram illustrating an example of a hardware structure of a main part of a transmission device and a reception device according to the first and the second embodiments.

FIG. 12 is a diagram illustrating an example of the hardware structure of a main part of the transmission device 10 and the reception device 20 according to the first and the second embodiments. The transmission device 10 and the reception device 20 according to the first and the second embodiments include a control device 301, a main storage device 302, an auxiliary storage device 303, an optical processing device 304, and a communication IF 305. The control device 301, the main storage device 302, the auxiliary storage device 303, the optical processing device 304, and the communication IF 305 are connected to each other through a bus 310.

The control device 301 executes programs read out from the auxiliary storage device 303 to the main storage device 302. The control device 301 is, for example, a CPU. The main storage device 302 is a memory such as a read-only memory (ROM) or a random access memory (RAM). The auxiliary storage device 303 is a memory card, a hard disk drive (HDD), or the like.

The optical processing device 304 transmits or receives the aforementioned single photon through the quantum communication channel 1. The communication IF 305 transmits or receives the control information and the like through the classical communication channel 2 such as the optical fiber or Ethernet (registered trademark).

The programs to be executed by the transmission device 10 and the reception device 20 according to the first and the second embodiments are stored in a computer-readable storage medium such as a CD-ROM, a memory card, a CD-R, or a DVD in the installable format or the executable format, and provided as a computer program product.

The programs to be executed by the transmission device 10 and the reception device 20 according to the first and the second embodiments may be stored in a computer connected to the network such as the Internet and provided by being downloaded via the network. Alternatively, the programs to be executed by the transmission device 10 and the reception device 20 according to the first and the second embodiments may be provided via the network such as the Internet without downloading.

The programs to be executed by the transmission device 10 and the reception device 20 according to the first and the second embodiments may be provided by being embedded in the ROM or the like.

In regard to the programs to be executed by the transmission device 10 according to the first and the second embodiments, the functional structures of the transmission device 10 according to the first and the second embodiments in the module structure include the function that can be implemented by the programs. In regard to the programs to be executed by the reception device 20 according to the first and the second embodiments, the functional structures of the reception device 20 according to the first and the second embodiments in the module structure include the function that can be implemented by the programs.

The functions to be implemented by the programs are loaded to the main storage device 302 when the control device 301 reads out the programs from the auxiliary storage device 303 or the like and executes the programs. In other words, the function implemented by the programs is generated on the main storage device 302.

The functions of the transmission device 10 and the reception device 20 according to the first and the second embodiments may be implemented by the hardware such as an integrated circuit (IC) either partly or entirely. The IC is, for example, a processor to execute the dedicated process.

In the case of implementing each function with the use of a plurality of processors, each processor may provide one of those functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission device for a second quantum communication system sharing a quantum communication channel with a first quantum communication system, the device comprising:
   a generator configured to generate a photon;
   a modulator configured to transmit a quantum signal generated by modulating the photon to a reception device;
   a controller configured to control the generator and the modulator; and
   a changer configured to input, to the controller, a control signal for changing an operation timing of the generator and an operation timing of the modulator when an error rate of the quantum signal of the first quantum communication system and an error rate of the quantum signal of the second quantum communication system are equal to or higher than a predetermined threshold, wherein the control signal includes a change quantity of the operation timing; and when receiving the control signal, the controller changes the operation timing by the change quantity, the change quantity being determined based on how many times the operation timing is changed.

2. The transmission device according to claim 1, wherein the predetermined threshold is determined based on an error rate of the quantum signal of the second quantum communication system in operation without sharing the quantum communication channel.

3. The device according to claim 1, wherein the predetermined threshold is dynamically determined based on an error rate of the quantum signal of the first quantum communication system calculated previously and an error rate of the quantum signal of the second quantum communication system calculated previously.

4. A transmission device for a second quantum communication system sharing a quantum communication channel with a first quantum communication system, the device comprising:

a generator configured to generate a photon;

a modulator configured to transmit a quantum signal generated by modulating the photon to a reception device;

a controller configured to control the generator and the modulator; and a changer configured to input, to the controller, a control signal for changing an operation timing of the generator and an operation timing of the modulator when an error rate of the quantum signal of the first quantum communication system and an error rate of the quantum signal of the second quantum communication system are equal to or higher than a predetermined threshold, wherein when receiving the control signals, the controller determines a change quantity and changes the operation timing by the change quantity, the change quantity being determined based on how many times the operation timing is changed.

5. A multi-quantum communication method for a second quantum communication system sharing a quantum communication channel with a first quantum communication system, the method comprising:

generating, by a generator, a photon;

transmitting, by a modulator, a quantum signal generated by modulating the photon to a reception device;

controlling, by a controller, the generator and the modulator; and inputting, by a changer, to the controller, a control signal for changing an operation timing of the generator and an operation timing of the modulator when an error rate of the quantum signal of the first quantum communication system and an error rate of the quantum signal of the second quantum communication system are equal to or higher than a predetermined threshold, wherein the control signal includes a change quantity of the operation timing; and when receiving the control signal, the controlling changes the operation timing by the change quantity, the change quantity being determined based on how many times the operation timing is changed.

* * * * *